(12) United States Patent
Young (10) Patent No.: US 10,014,788 B2
(45) Date of Patent: Jul. 3, 2018

(54) METHOD OF CONTROL FOR SYNCHRONOUS RECTIFIERS

(71) Applicant: Eisergy Limited, Dublin (IE)

(72) Inventor: George Young, Dublin (IE)

(73) Assignee: Icergi Limited, Dublin (IE)

( * ) Notice: Subject to any disclaimer, the term of this patent is extended or adjusted under 35 U.S.C. 154(b) by 112 days.

(21) Appl. No.: 14/777,087

(22) PCT Filed: Mar. 14, 2014

(86) PCT No.: PCT/EP2014/055213
§ 371 (c)(1),
(2) Date: Sep. 15, 2015

(87) PCT Pub. No.: WO2014/140350
PCT Pub. Date: Sep. 18, 2014

(65) Prior Publication Data
US 2016/0013714 A1    Jan. 14, 2016

(30) Foreign Application Priority Data
Mar. 15, 2013 (GB) .................................. 1304708.9

(51) Int. Cl.
*H02M 3/335* (2006.01)
*H02M 1/00* (2006.01)

(52) U.S. Cl.
CPC .................. *H02M 3/33592* (2013.01); *H02M 2001/0058* (2013.01); *Y02B 70/1433* (2013.01); *Y02B 70/1475* (2013.01); *Y02B 70/1491* (2013.01)

(58) Field of Classification Search
CPC ............... H02M 1/00; H02M 3/33592; H02M 2001/003; H02M 2001/0058
See application file for complete search history.

(56) References Cited

U.S. PATENT DOCUMENTS

| | | | |
|---|---|---|---|
| 6,813,166 B1 | 11/2004 | Chang | |
| 6,870,747 B2 | 3/2005 | Bridge | |
| 6,961,253 B1 * | 11/2005 | Cohen | ..................... H02M 1/08 363/89 |
| 7,495,934 B2 | 2/2009 | Chen et al. | |

(Continued)

FOREIGN PATENT DOCUMENTS

WO    WO 2001028079    4/2001

OTHER PUBLICATIONS

Feng, et al., "A Universal Adaptive Driving Scheme for Synchronous Rectification in LLC Resonant Converters", Aug. 1, 2012, pp. 3775-3781, vol. 27, No. 8, Publisher: IEEE Transactions on Power Electronics, Institute of Electrical and Electronics Engineers, USA.

(Continued)

*Primary Examiner* — Fred E Finch, III
*Assistant Examiner* — Rafael O. De León Domenech
(74) *Attorney, Agent, or Firm* — Charles A. Lemaire; Jonathan M. Rixen; Lemaire Patent Law Firm, P.L.L.C.

(57) ABSTRACT

The present application relates to the field of switching power supplies and in particular to switching power supplies in which a primary side is isolated from the secondary side and in which a synchronous rectifier on the secondary side is controlled from the primary side. The application provides a method for minimizing body diode conduction losses.

14 Claims, 5 Drawing Sheets

(56) References Cited

U.S. PATENT DOCUMENTS 7,558,082 B2 7/2009 Jitaru
2013/0114308 A1* 5/2013 Liao .................. H02M 3/33507
363/21.01

OTHER PUBLICATIONS

"PCT Search Report/Written Opinion for related PCT/EP2014/055213 application, dated Mar. 2, 2015, 13 pages".

* cited by examiner

METHOD OF CONTROL FOR SYNCHRONOUS RECTIFIERS

FIELD OF THE APPLICATION

The present application relates to the field of switching power supplies and in particular to switching power supplies employing a synchronous rectifier

BACKGROUND OF THE APPLICATION

In isolated switching supplies the general principle is that a primary side voltage is switched through a winding on the primary side of a transformer. One or more rectifiers are employed at the secondary side of the transformer in the provision of an output voltage.

Whilst a variety of different topologies are known including Flyback, LLC and Forward converters, the general principle remains.

There is always a general desire to improve the efficiency of switching supplies. The use of a conventional p-n junction diode as a rectifier causes a power loss in the diode arising from a voltage drop across the diode of anywhere between 0.7 V and 1.7 V. This can be improved upon using Schottky diodes which exhibit lower voltage drops (as low as 0.3 volts).

However, further improvements are possible using a synchronous rectifier in which the diode is replaced by an actively controlled switching element such as a MOSFET. The actively controlled switch is switched so as to be on during the same time period that a diode would have inherently switched on. Active switching devices such as MOSFETs have a very low on-resistance meaning a reduction in power loss and a gain in efficiency.

However a known difficulty with using actively controlled switches such as MOSFETs is that the timing for controlling the switch is important to ensure efficient operation. Turning off a switch too early may result in body diode conduction and turning off the switch too late may result in negative current flow. In both of these cases, losses increase. At the same time, it is desirable to control the switch from the primary side since the synchronous nature is generally linked with the operation of one or more switches on the primary side.

To address this issue, various secondary-side "local" control approaches have been used, principally based around current sensing in the rectifier element. Disadvantages associated with these approaches include sensing difficulties in terms of timing and in terms of power loss.

The present application seeks to provide a primary side method of control for a secondary side synchronous rectifier.

SUMMARY

Accordingly a first aspect of the present application provides a method of controlling a synchronous rectifier in a switching power supply having an inductive element. The inductive element may be a transformer or an inductor depending on the nature and topology of the switching power supply. The inductive element suitably has a primary winding which is used to store energy during switching cycles and an auxiliary winding which is employed as a sense or measurement winding. In the case of a transformer, there is also a secondary side winding. The method comprises operating the synchronous rectifier to turn on at a first position and to turn off at a second position in a switching cycle of the switching power supply, obtaining a measurement from an auxiliary winding of the transformer at a position after the second position and adjusting the second position in a subsequent switching cycle based on a value derived from the obtained measurement.

The step of operating the synchronous rectifier to turn on at a first position and to turn off at a second position in a switching cycle may comprise providing a single switching pulse with turn on effected at the start of the pulse and turn off effected by the end of the pulse.

Alternatively, the step of operating the synchronous rectifier to turn on at a first position comprises providing a first pulse at the first position and a separate second pulse is employed to turn off the switch at the second position.

The value derived is the obtained measurement less a second value. This second value is suitably a value representative of the output voltage on the secondary side as reflected back through the auxiliary winding. The second value may be obtained by a measurement from an auxiliary winding of the transformer at a position before the second position.

The measurement may be provided to a control function which in turn provides a control output to adjust the second position.

This control function suitably seeks to minimise the measurement value over time.

The measurement may an instantaneous measurement or an aggregated measurement obtained during a sampling period.

In a further aspect of the invention, a controller is provided for performing the method of the first aspect of the invention. More particularly a controller is provided for operating a synchronous rectifier in a switching power supply comprising a transformer with a primary side winding and a secondary side winding, the controller being configured to provide a first signal to cause the synchronous rectifier to turn on at a first position and to provide a second signal to turn off the synchronous rectifier at a second position in a switching cycle of the switching power supply, the controller being configured to receive a measurement from an auxiliary winding of the transformer at a position after the second position and where the controller adjusts the second position in a subsequent switching cycle based on a value derived from the obtained measurement.

These and other features will be better understood with reference to the following which are provided to assist in an understanding of the teaching of the benefits derived from the present invention but are not to be construed as limiting in any fashion.

DESCRIPTION OF DRAWINGS

The present application will now be described with reference to the accompanying drawings in which.

DETAILED DESCRIPTION

The application will now be described with reference to an exemplary switching converter, and more particularly an LLC resonant converter. The LLC converter is used in switching converters which include a power factor correction deployment, typically between a capacitor fed from a power-factor correction stage and the load.

The operation of the circuit is well known and would be familiar to those skilled in the art.

Figure 1:
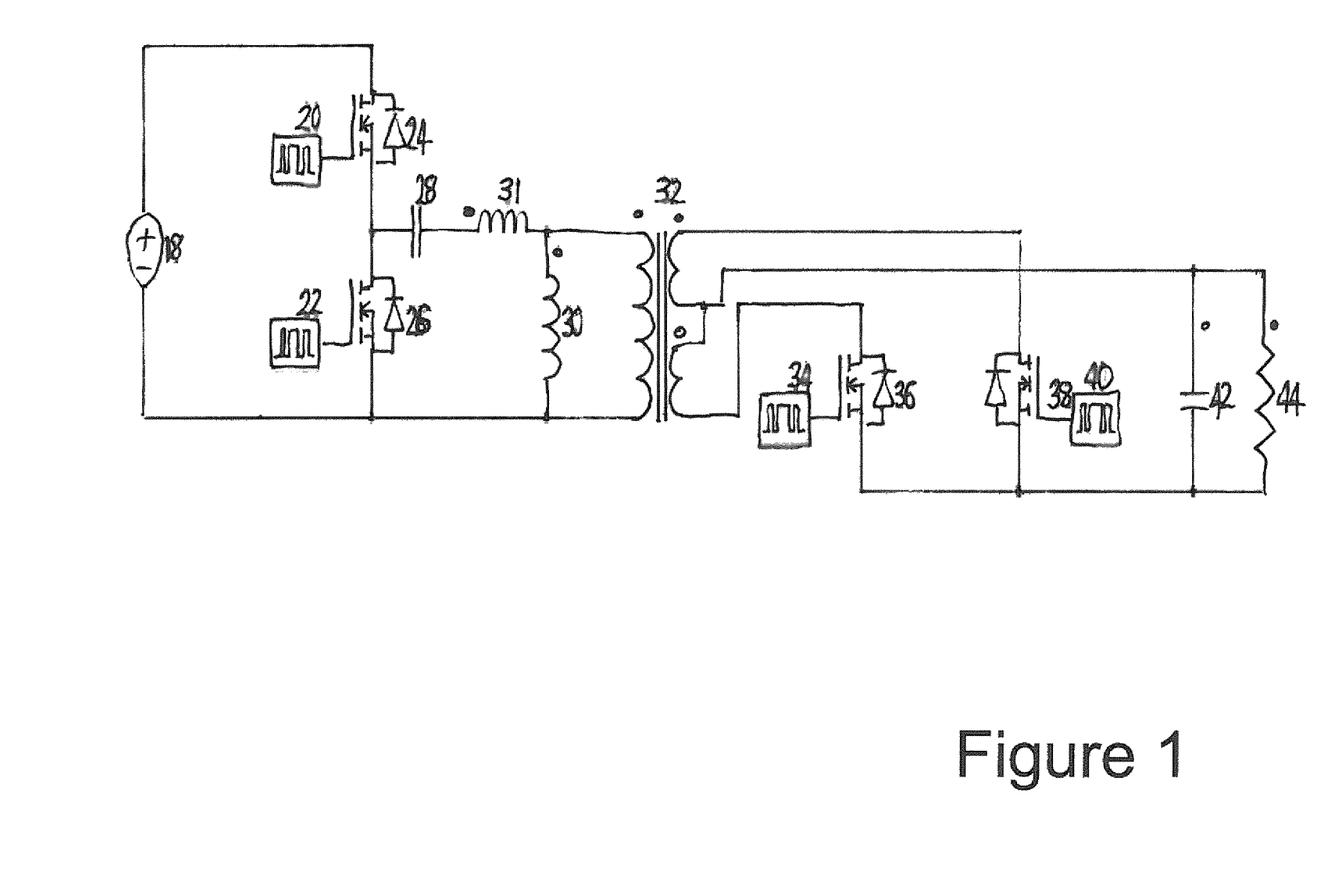
FIG. 1 illustrates a known LLC converter employing synchronous rectifiers.

In brief, as shown in FIG. 1, two primary side switches 24 and 26 are operated as a symmetric half-bridge with a nominally 50:50 drive ratio. A small dead-time is generally introduced to allow current to drive the drain voltage of the switch that is about to conduct to zero.

The output from the symmetric half bridge is connected to a capacitor 28 which in turn is connected to and drives an inductor/transformer assembly 31, 30 and 32. The inductor/transformer assembly comprises an inductor 31 which is in series with the capacitor and the parallel combination of magnetising inductor 30 and the primary winding of transformer 32. The individual elements 30, 31 and 32 may be provided discretely although frequently they are combined into one magnetic element. These elements give rise to a series resonant frequency determined by the values of capacitor 28 and inductor 31 and a parallel resonance determined by including the magnetising inductor 30.

A number of variations in this circuit are possible. For example, the capacitor 28 may consist of two capacitors connected one to each rail, and the inductor 32 may have a single secondary winding used with a voltage doubler or full-bridge rectifier configuration rather than the half-bridge shown.

Synchronous rectifiers 36 and 38 are driven by signals from drivers 34 and 40 respectively, feeding an output capacitance 42 and load 44. The drive signals are such that each synchronous rectifier is turned on generally in synchronisation with the appropriate primary switch. If the converter is operated at or above series resonance (as determined by 28 and 31), the synchronous rectifier is switched off substantially at the same time as the corresponding primary switch.

The optimal operating condition for a converter of this type is often in the frequency range just below the series-resonant frequency. If diodes were used for rectifiers 36 and 38, these would inherently turn off under benign zero-current conditions. As explained in the background, when controlled synchronous rectifiers are used, it is desirable to turn these off under close to zero-current conditions also. Turning off the switch too early will result in body diode conduction and turning off the switch too late will result in negative current flow. In both these cases, losses increase.

It will be recognised that there are essentially two alternative types of control applied to LLC resonant converters of this type, with each type described as follows.

The first type of control involves feedback of voltage from the secondary side, with the main control loop used to adjust the frequency. This in turn affects the gain or voltage conversion ratio of the converter, and frequency can be adjusted such that the desired output voltage is obtained. The control task for a minor loop associated with efficiency optimisation relates to the relative timing of turn-off of the synchronous rectifiers. Typically a minimum value for synchronous rectifier conduction time is established based on knowledge of circuit parameters, and the minor loop optimises timing to accommodate component tolerances, age effects and second-order effects associated with different operating conditions. The minor control loop then extends this timing to minimise body diode conduction subject to the limitation that reverse current does not flow. Typically the minor loop will operate an order of magnitude slower than the main control loop. Minor loop may be controlled based on the method of body diode conduction measurement described below.

In the second type of control, the goal is to have open-loop (i.e. no voltage feedback from the output) operation at series-resonance such that a quasi-fixed transformation ratio is obtained, and this condition can be detected by sensing the point between body diode conduction and negative current flow conditions in synchronous rectifier elements. The turn-off drive for the synchronous rectifiers is in the mode synchronised with the turn-off of the primary switches, and thus the frequency of the converter can be adjusted based on detection of this point for synchronous rectifier operation. The converter here will typically be designed such that the gain-frequency curve is relatively flat in the calculated operating range and the control can thus be regarded as a low background-mode efficiency optimisation. As with the first type of control, the second type of control may also be performed based on the method of body diode conduction measurement described below.

Controllers for switching LLC converters or indeed any switching converter can benefit from primary-side control, with synchronous rectifier control provided centrally from a controller on the primary side with gate drive signals provided effectively, economically and with excellent timing accuracy.

The present application is directed towards providing a method by which the transition conditions between body-diode conduction and negative current flow may be measured on the primary side.

To perform this, the present application uses an indirect measure of secondary side values by using an auxiliary winding on the transformer. The output from this auxiliary winding is provided to the primary-side controller which in turn derives secondary side measurements. The auxiliary winding may be provided as a separate winding with no other function or it may for example have another function, for example to provide a bias supply to the primary-side controller. Although, depending on the implementation this may not be practical, since for example the bias supply may be loaded excessively by diode pulse currents. In such a circumstance a separate sense winding is desirable for the auxiliary winding.

The mode of operation of the present application will now be described with reference to some exemplary waveforms as might be produced from an auxiliary winding.

Figure 2:
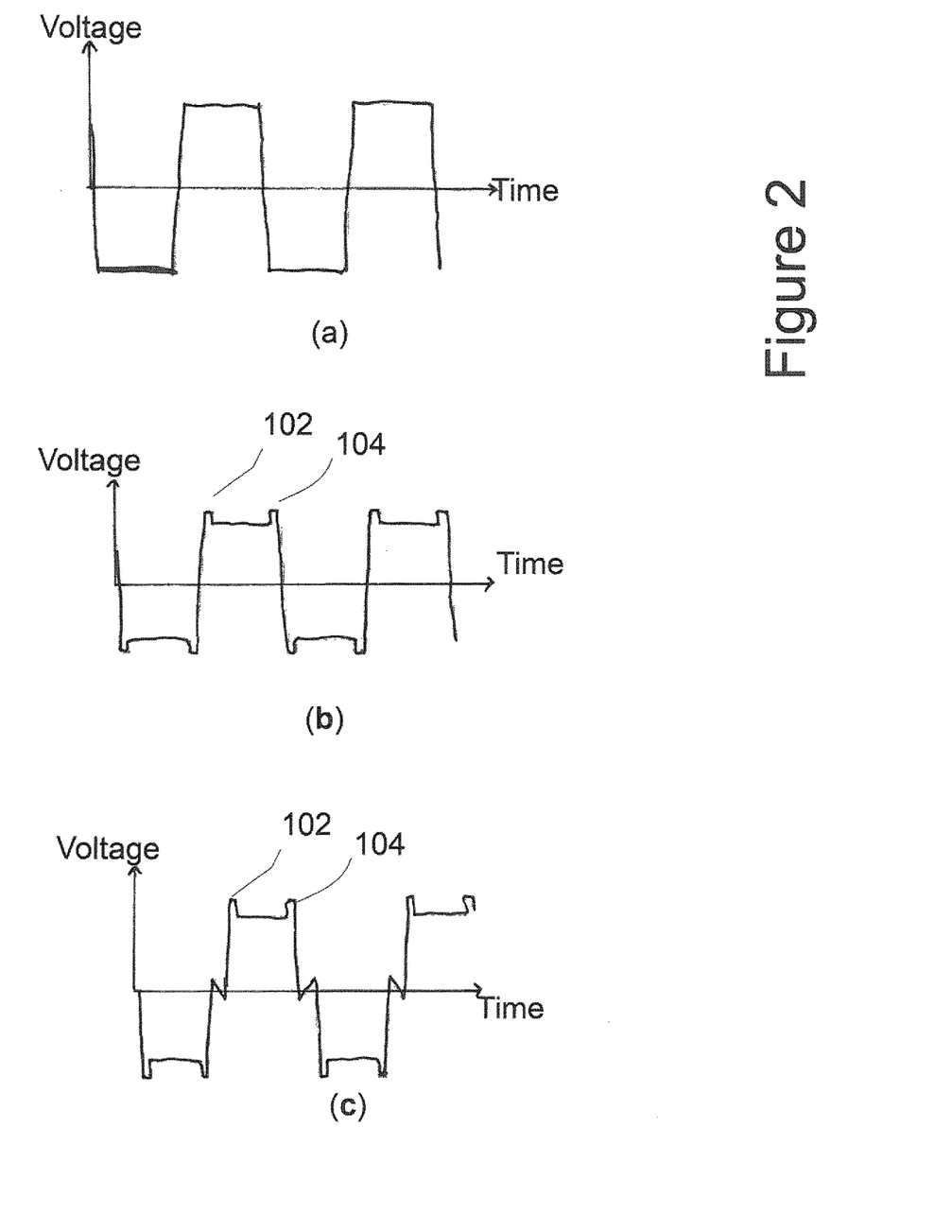
FIG. 2 illustrates exemplary waveforms that may be observed in the LLC converter of FIG. 1.

The voltage waveform across such a winding in an "ideal" condition (at or above series resonance) may be as shown in FIG. 2(*a*). However, in a practical case, the waveform is likely to have "ears" as in shown FIG. 2(*b*). Similarly, it may appear as shown in FIG. 2(*c*), corresponding also to a condition where the converter is operated below the series resonant frequency.

Figure 3:
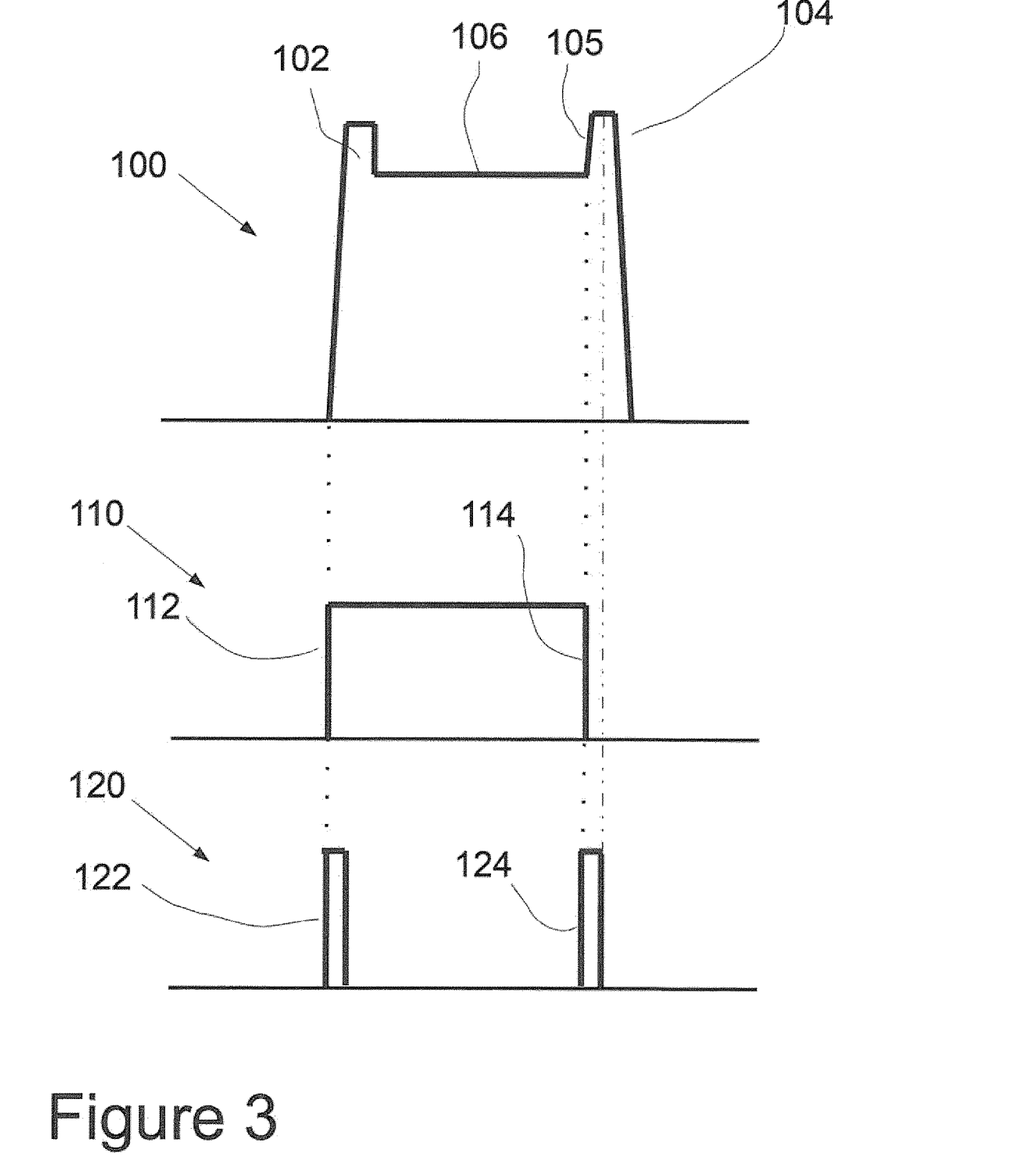
FIG. 3 is an enlarged view of a portion of a waveform of illustrated in FIG. 2 and the associated exemplary switching signals.

The first "ear" after the transition from high-low or vide-versa typically represents some practical issues associated with ensuring precise timing associated with the switch-on of the synchronous rectifier as may be seen from FIG. 3 in which an exemplary switching waveform 110 for a half switching cycle is shown with the corresponding measurement 100 from the auxiliary winding. More particularly, the synchronous rectifier starts to turn on at a first position corresponding with the rising edge 112 of the switching waveform. The switch-on "ear" 102 is typically quite short and may be associated with a condition of low current flow on the secondary side (i.e. the losses associated with this are relatively small). Parasitic ringing effects may also contribute to the appearance of a small spike. This waveform aspect is however not particularly relevant to considerations in this application.

It should be appreciated although not apparent from the exemplary figures that the first "ear" 102 at the point where the synchronous rectifier is turned on is not the same as the second "ear" 104 at the end of the conduction period.

The present application uses a measurement of the "ear" 104 that appears after the synchronous rectifier is switched off. The measurement of the "ear" is employed as an indication as to whether the synchronous rectifier timing is working correctly. This "ear" represents the voltage of the body diode of the synchronous rectifier reflected back through the auxiliary winding. It will be appreciated that the "ear" 104 appears in situations where the synchronous rectifier is turned off too early and the current continues to flow through the body diode of the synchronous rectifier. More particularly, the synchronous rectifier turns off at a second position corresponding with the falling edge 114 of the switching waveform. It will be understood that there may be a delay inherent in turning on, illustrated by the transition 105 prior to full body diode conduction, and turning off the synchronous rectifier. In the exemplary waveform of FIG. 3, the current in the secondary winding continues to flow but does so through the body diode of the synchronous rectifier, which represents a loss.

Whilst a synchronous rectifier may be operated by a single waveform 110 with turn on effected by the rising edge and turn off effected by the falling edge, for example using a transformer to transfer the waveform to the synchronous rectifier, it is also known prior to full body diode conduction to use two separate pulses to operate a synchronous rectifier, as illustrated by waveforms 120, in which a first pulse 122 might be used to turn on the synchronous rectifier with a second pulse 124 employed to switch off the synchronous rectifier. Thus the reference to first position and second position being controlled may be taken to refer to the rising and falling edges of the single pulse 110 or the position (notionally rising edges) of the first and second pulses 122, 124. An example of an arrangement in which first and second pulses are employed to effect control of a synchronous rectifier is described in GB1304723.8, the entire contents of which are hereby incorporated by reference.

The present application operates from the premise that regardless of whether a single pulse or dual pulses are used to operate the synchronous rectifier, the synchronous rectifier drive timing relative to the primary switching instants should be adjusted so as to minimise the width of the "ear" that appears at the end of the conduction period. Alternatively stated, the position where the synchronous rectifier is turned on should be adjusted with the position where the synchronous rectifier is turned off so as to minimise body conduction losses of the synchronous rectifier.

Figure 4:
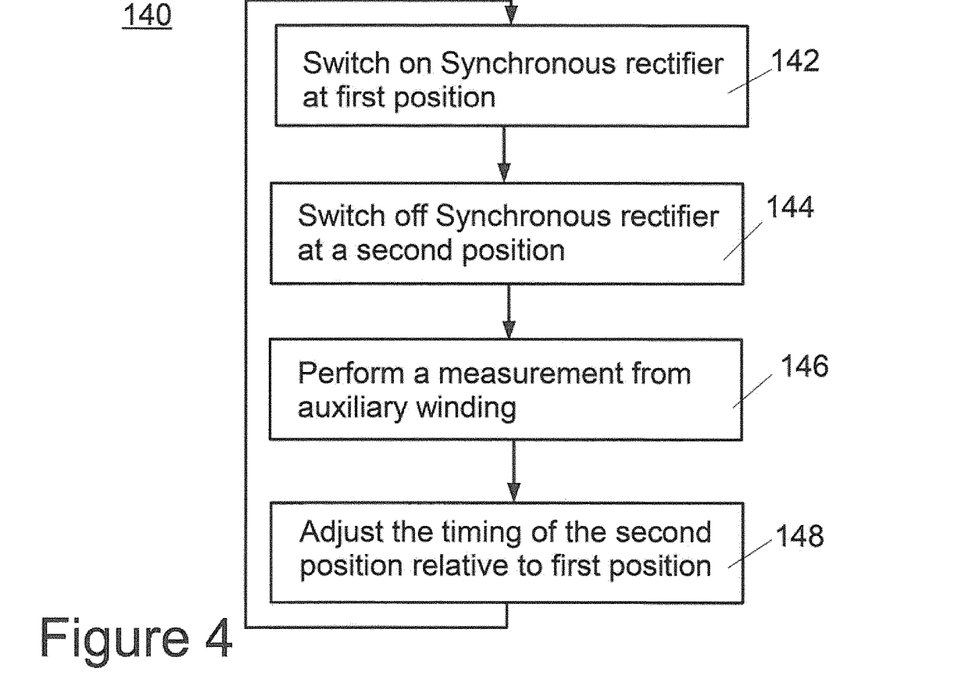
FIG. 4 illustrates a method according to an aspect of the present application.

More particularly, a method is provided which seeks to perform a measurement with respect to the second "ear". The measurement may be used in a controller controlling the synchronous rectifier to adjust the timing of the second position with respect to the first position. In greater detail, and with reference to the process flow 140 of FIG. 4 and the control arrangement 150 of FIG. 5, a controller 152 which is provided on the primary side of the transformer of a switching supply generates 142 a signal at a first position in a switching cycle to turn on a synchronous rectifier. For ease of illustration the controller is shown simply as operating a single synchronous rectifier. As the controller is provided on the primary side, a drive circuit 154 is employed to provide a drive signal to the synchronous rectifier 156 on the secondary side. In the case of a single pulse such as pulse 110 in FIG. 3, the drive circuit may simply comprise a small transformer. The drive circuit may be more complicated, for example when the two-pulse 120 mode of operation is employed and in which case two transformers are generally required with the first for turning on and the second for turning off the synchronous rectifier.

Figure 5:
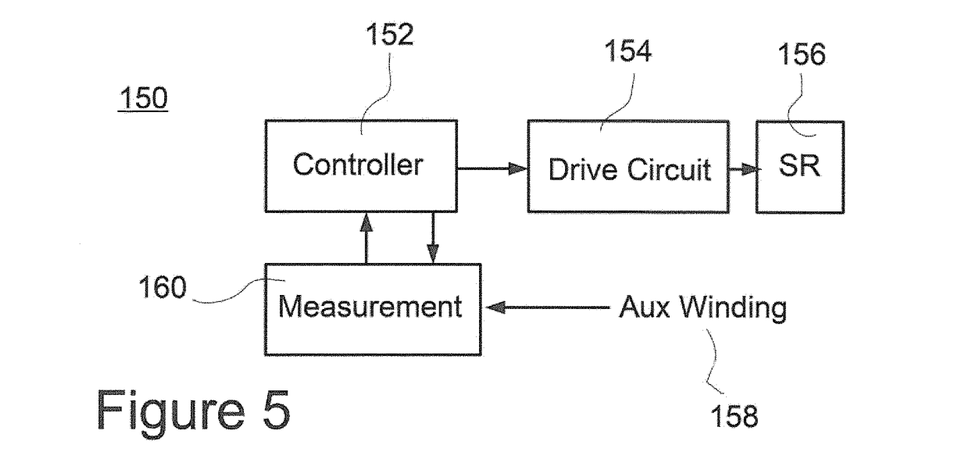
FIG. 5 shows a control arrangement according to a further aspect of the present application.

The controller causes the synchronous rectifier through the drive circuit 154 to turn off at a second position in the switching cycle of the switching power supply. A measurement circuit 160 obtains 146 a measurement from an auxiliary winding of the transformer at a position shortly after the second position. More particularly, the measurement circuit receives a signal from the controller and uses this signal to determine a position to perform a measurement. The determined position may be set using a predetermined delay which is relatively short compared to the duration of the switching cycle, for example in the range of 1/100 to 1/10,000 the duration of the switching cycle. Where there are two separate pulses for turning on and turning off the Synchronous rectifier, the falling edge of the pulse employed to turn off the synchronous rectifier may be advantageously employed. The measurement obtained is used to identify the presence of an "ear" (representing body diode conduction losses) or to provide a measure of the size of the conduction losses occurring. The controller having this measurement may operate in a variety of different ways depending on the particular control algorithm selected. The controller operates to effectively reduce body diode conduction losses in the synchronous rectifier by adjusting 148 the second position in a subsequent switching cycle based on a value derived from the obtained measurement. The derived value may be a series of values obtained from a plurality of switching cycles.

The method is generally concerned with the identifying and measurement of the size of the "ear" relative to the measurement 106 from the auxiliary winding when the synchronous rectifier is switched on. A difficulty with this is that the difference between the value of the "ear" voltage as presented by auxiliary winding and that value 106 presented when the synchronous rectifier is turned on may be relatively small and hence difficult to detect.

Accordingly, subtracting out the earlier value allows for a more reliable measurement (since, in practise as will be explained below, it is the width rather than the amplitude of the "ear" that is important). An initial measurement may be obtained from the auxiliary winding at a point between the first and second positions. This measurement may be subtracted from the subsequent measurement for the "ear" to provide the derived value on which the controller operates. A convenient implementation of such an approach is discussed below in greater detail with respect to FIG. 6. Alternatively, a predetermined value (representative of the expected output voltage reflected back through the auxiliary winding) may be employed or indeed a measurement of the output voltage obtained by another means may be employed (albeit adjusted to account for the ratio of turns between the auxiliary winding and the secondary winding).

Figure 6:
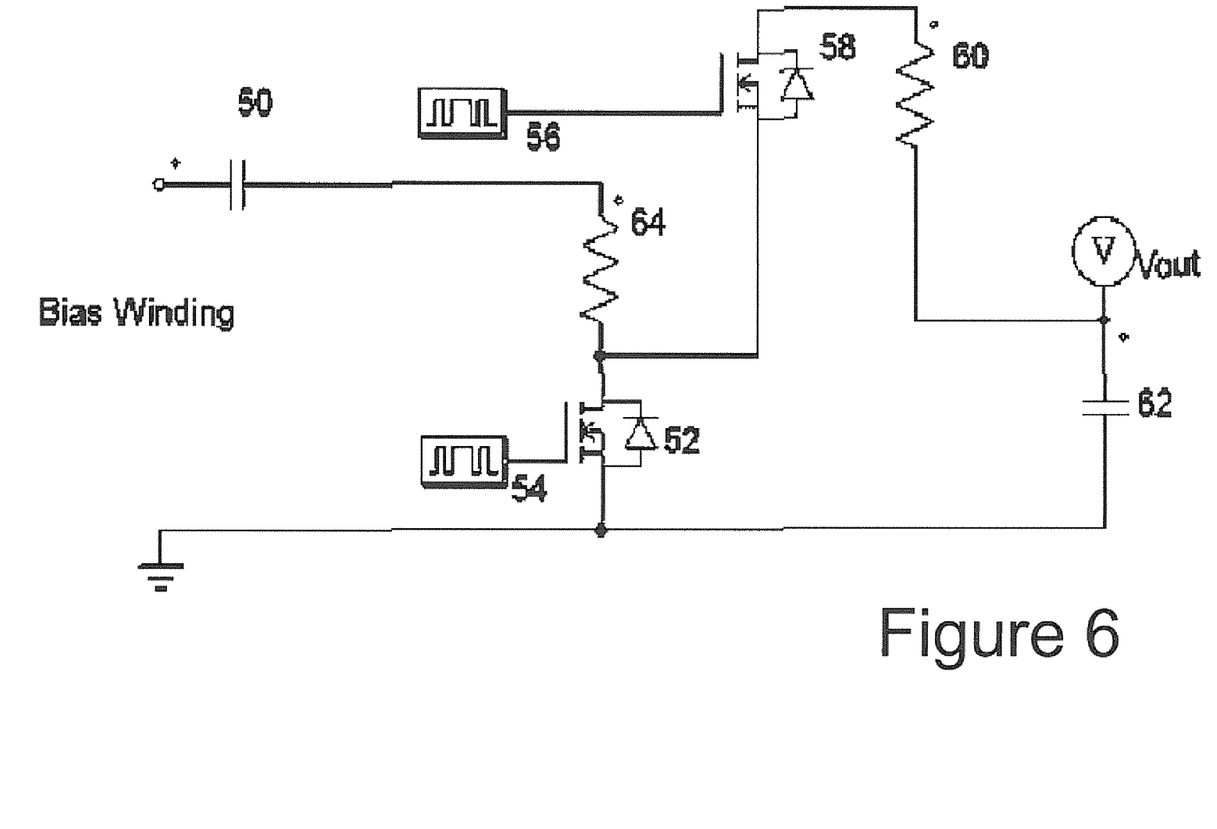
FIG. 6 shows a measurement circuit according to another aspect of the present application.

A convenient measurement circuit and method for obtaining a smoothed voltage waveform proportional to the amplitude and duration of the "ear" will now be described with reference to FIG. 6. However, in practice the amplitude is constant and effectively set as the reflected value of the body-diode conduction voltage which is typically around 1V for most silicon switches, or twice this if a full-bridge rectifier is used on the secondary side.

Thus since the amplitude is going to be relatively constant, it is the measure of width that is more important for the minimisation of the width of the "ear".

In the circuit, capacitor 50 functions with switch 52 analogous to a "DC restore" circuit.

During the on-phase as determined by a control signal 54 from the controller of the converter, the capacitor charges up to the reflected output voltage as switch 52 is "on" during this phase. A resistor 64 may be provided in series with the capacitor to limit current in switch 52. A second switch 58 is operated in a complementary fashion to that of the first switch. The second switch may, for example where two pulse operation is employed as described above, be synchronously operated with the synchronous rectifier turn-off drive pulse. In this case, the complement of this drive signal may be used to drive switch 52. The voltage level of the "ear" above the reflected normal output voltage is thus captured in this fashion and integrated using resistor 60 and capacitor 62 to provide a measure to the controller.

This signal can thus be the key input to a control loop. This control loop can determine the synchronous rectifier turn-off timing relative to the primary side drive in the case of overall voltage feedback where the converter is operating below the series-resonant frequency or the minor loop described above. In the case of open-loop voltage operation, the control loop can control the frequency of operation.

It will be appreciated that whilst minimising diode body conduction losses is desirable, operating a switching power supply at the point where this occurs precisely may be extremely difficult without straying into a negative current flow situation. As will be appreciated by those skilled in the art, negative current flow situations are generally less desirable than diode body conduction losses. Accordingly, the controller may be set to operate about a predetermined minimum value of "ear" so as to limit the opportunity of negative flow conditions arising.

Thus for example, the control loop employed within the controller may be a linear PID-type. The controller may be selected to have a reference finite small value of body-diode conduction. Alternatively a digital approach may be used where the controller periodically shortens the drive period for the synchronous rectifier to provoke an "ear" condition and then "backs off" by increasing the drive period slightly.

The method the present application may be employed with a variety of different switching topologies using a transformer including for example but not limited to Flyback and LLC converters. It may also be used with other topologies using an inductor, for example, a forward type converter. In this arrangement, an auxiliary winding on the inductor may be employed for sensing. Thus the technique of the present application may be advantageously employed generally in a switching power supply having an inductive element. The inductive element may be either an inductor or a transformer.

It will be appreciated that whilst several different embodiments have been described herein, the features of each may be advantageously combined together in a variety of forms to achieve advantage and that variations are possible. In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention. It will be understood that whilst particular polarity devices, e.g. PMOS, NMOS, PNP or NPN may be illustrated in the figures, that alternative polarity devices may be employed by appropriate modification of the circuits.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments. Equally, whilst the claims are directed to an isolated gate drive or reset circuit for same, the application is not to be construed as being so limited and extends to a method for doing same.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of controlling a synchronous rectifier in a switching power supply that includes an inductive element, the method comprising:
operating the synchronous rectifier to turn on at a first time position and to turn off at a second time position in a first switching cycle of the switching power supply;
obtaining a first measurement from an auxiliary winding of the inductive element at a time position after the second time position; and
adjusting the second time position in a second switching cycle subsequent to the first switching cycle based on a first value derived from the obtained first measurement, wherein the first value is the obtained first measurement less a second value representative of a second measurement from the auxiliary winding prior to the second time position.

2. The method according to claim 1, wherein the operating of the synchronous rectifier to turn on at a first time position and to turn off at a second time position in the first switching cycle comprises providing a switching pulse with turn on effected at a start of the pulse and turn off effected by an end of the pulse.

3. The method according to claim 1, wherein the operating of the synchronous rectifier to turn on at a first time position in the first switching cycle comprises providing a first pulse at the first time position, and providing a second pulse to turn off the switch at the second time position.

4. The method according to claim 1, wherein the second value is obtained by obtaining the second measurement from the auxiliary winding at a time position before the second time position.

5. The method according to claim 1, wherein the inductive element is a transformer and the second value is a value representative of an output voltage on a secondary side of the transformer as reflected back through the auxiliary winding.

6. The method according to claim 1, wherein the first measurement is provided to a control function which in turn provides a control output to adjust the second time position.

7. The method according to claim 6, wherein the control function seeks to minimize the first measurement over time.

8. The method according to claim 1, wherein the first measurement is an instantaneous measurement.

9. The method according to claim 1, wherein the first measurement comprises an aggregated measurement obtained during a sampling period.

10. The method according to claim 1, wherein the switching power supply comprises a transformer with a primary side winding and a secondary side winding.

11. The method according to claim 10, wherein the synchronous rectifier is on the secondary side winding of the transformer, the method further comprising:
providing a controller on the primary side winding of the transformer; and
performing the operating, obtaining, and adjusting using the controller.

12. The method according to claim 1, further comprising operating the switching power supply as a fixed ratio-converter and using the first measurement to determine a switching frequency of the power supply.

13. A controller for operating a synchronous rectifier in a switching power supply that includes an inductive element, the controller comprising:
one or more outputs configured to provide a first signal to cause the synchronous rectifier to turn on at a first time position in a first switching cycle of the switching power supply, and that provide a second signal to turn off the synchronous rectifier at a second time position in the first switching cycle of the switching power supply; and
one or more inputs configured to receive a first measurement from an auxiliary winding of the inductive element at a time position after the second time position, wherein the controller is configured to adjust the second time position in a second switching cycle subsequent to the first switching cycle based on a first value derived from the received first measurement, wherein the first value is the received first measurement less a second value representative of a second measurement from the auxiliary winding prior to the second time position.

14. The controller of claim 13, wherein the controller is configured to perform the second measurement at the one or more inputs at a time position before the second time position to provide the second value.

* * * * *